United States Patent [19]

Kumaki

[11] 4,107,747

[45] Aug. 15, 1978

[54] FLUIDIC CONTROLLED CARTRIDGE EJECTOR

[75] Inventor: Noboru Kumaki, Tokyo, Japan

[73] Assignee: Sony Corporation, Tokyo, Japan

[21] Appl. No.: 732,136

[22] Filed: Oct. 13, 1976

[30] Foreign Application Priority Data

Oct. 15, 1975 [JP] Japan .............................. 50-140287[U]

[51] Int. Cl.² ......................... G11B 15/00; G11B 5/00
[52] U.S. Cl. ....................................... 360/93; 360/95; 360/137
[58] Field of Search ...................... 360/85, 92, 93, 94, 360/95, 96, 137; 242/198

[56] References Cited

U.S. PATENT DOCUMENTS

| 3,630,528 | 12/1971 | Ban ........................................... 360/93 |
| 3,863,267 | 1/1975 | Yasukatsu ............................... 360/93 |
| 3,955,216 | 5/1976 | Fujita ...................................... 360/93 |

Primary Examiner—Vincent P. Canney
Attorney, Agent, or Firm—Lewis H. Eslinger; Alvin Sinderbrand

[57] ABSTRACT

A tape recording and/or reproducing apparatus includes a tape cassette holder or carriage which is movably mounted on the housing of the apparatus for movement between a first loading position extending from the housing and a second recording and/or reproducing position in the housing. The tape is placed in the cassette holder in its first position and the holder is then moved manually to the operating position. As this is done a spring used for returning the holder to its first position, in an eject operation, is energized so that the cassette holder is automatically returned back to its first position by the energized spring when the eject mechanism of the apparatus is operated. In this apparatus an automatic speed adjusting mechanism is provided which does not disturb or interfere with movement of the cassette holder from its first, eject position to its second, operating position, but which controls the speed of movement of the cassette holder during the eject operation. As a result the loading operation for the tape cassette can be smoothly effected, as in conventional tape recording and reproducing apparatus, but the cassette holder will move back to its eject position during an eject operation at a safe and controlled speed.

13 Claims, 8 Drawing Figures

FLUIDIC CONTROLLED CARTRIDGE EJECTOR

BACKGROUND OF THE INVENTION

1. Field of the Invention

The present invention relates to tape recording and/or reproducing apparatus, such as, for example, a tape deck, a tape recorder or a VTR, which includes a cassette holder or carriage which is movably mounted in the apparatus for movement between a loading or eject position opening outwardly of the apparatus and a recording or reproducing position within the apparatus, and, more particularly, to such an apparatus which includes means for automatically returning the cassette holder from its recording or reproducing position to its loading position upon operation of a cassette ejecting means in the apparatus.

2. Description of the Prior Art

The conventional front operation type tape deck has a cassette holder or carriage generally referred to as a "kangaroo pocket" which is mounted in an opening formed in a front panel of the tape deck, with the kangaroo pocket type cassette holder having a size substantially equal to that of the opening. The cassette holder is usually rotatably mounted in the deck and is movable back and forth between a loading or eject position at which the cassette holder is inclined with respect to the front face of the tape deck to project outside of the opening, and an operating position at which the cassette holder is located within the deck opening in an upright position for recording and/or reproducing on a tape cassette therein. When a tape cassette is loaded in the cassette holder, the cassette is inserted into the slanted cassette holder at the loading and eject position thereof, and then the cassette holder is manually pushed into its operating position where it is locked in place. In this position the tape cassette is vertically positioned for a recording and/or reproducing operation.

In the usual apparatus of this type, movement of the cassette holder during a loading operation engages a spring in the tape deck which is engaged with the cassette holder for producing a spring force which will be used to return the cassette holder back to its loading position when an eject operation for the tape cassette is effected. For this purpose an eject button is usually provided on the front panel of the tape deck which controls a latching mechanism normally locking the cassette holder in its vertical position but releasing the holder when the button is pushed so that the cassette holder will automatically move back to its loading and eject position under the influence of the previously charged spring, whereby the tape cassette can be removed from the cassette holder.

Conventional tape decks of this type suffer from the disadvantage that the return speed of movement of the cassette holder from its operating position to its loading position, on ejection, is usually very fast, because of the spring force produced in the energized spring. Accordingly, the cassette holder moves back to the eject position almost instantaneously, and very impulsively, on operation of the eject button. As a result, if the operator is unfamiliar with the operation of the cassette holder, the conventional eject mechanism has the great danger that the cassette holder will collide unexpectedly with the hand of the operator on the eject movement and cause an injury. And, in addition, a very strong and jarring impulse is given to whole of the tape deck at the terminating point of the eject movement of the cassette holder when further movement of the holder under the influence of the spring is blocked. This impulse force has an undesirable influence on each part of the tape deck, and shortens the life of the tape deck, since each part of the deck will wear or get out of adjustment due to the vibrations accompanying the impulse.

SUMMARY OF THE INVENTION

It is an object of this invention to provide a recording and/or reproducing apparatus wherein a tape cassette holder will move back to its loading and eject position from its operating position at a safe speed.

Another object of this invention is to provide a tape cassette type recording and/or reproducing apparatus wherein the impulse force usually applied to such apparatus during an eject operation is substantially eliminated.

A further object of this invention is to provide a tape cassette recording and/or reproducing apparatus having these advantages without affecting movement of the cassette holder during a loading operation.

According to another aspect of the present invention, a magnetic tape recording and/or reproducing apparatus includes a cassette holder or carriage which is movably mounted in the apparatus between a first loading position and a second operating position for recording and/or reproducing. The cassette holder is automatically returned to its loading position upon actuation of an eject button by a spring engaged with the cassette holder, and an automatic speed adjusting means is provided which will resist movement of the cassette holder under the influence of the spring to control the speed of such movement, but without interfering with movement of the holder from its loading to its operating position.

The above and other objects, features and advantages of this invention will become apparent from the following detailed description of illustrative embodiments thereof which is to be read in connection with the accompanying drawings, wherein:

DESCRIPTION OF THE PREFERRED EMBODIMENTS

Figure 1:
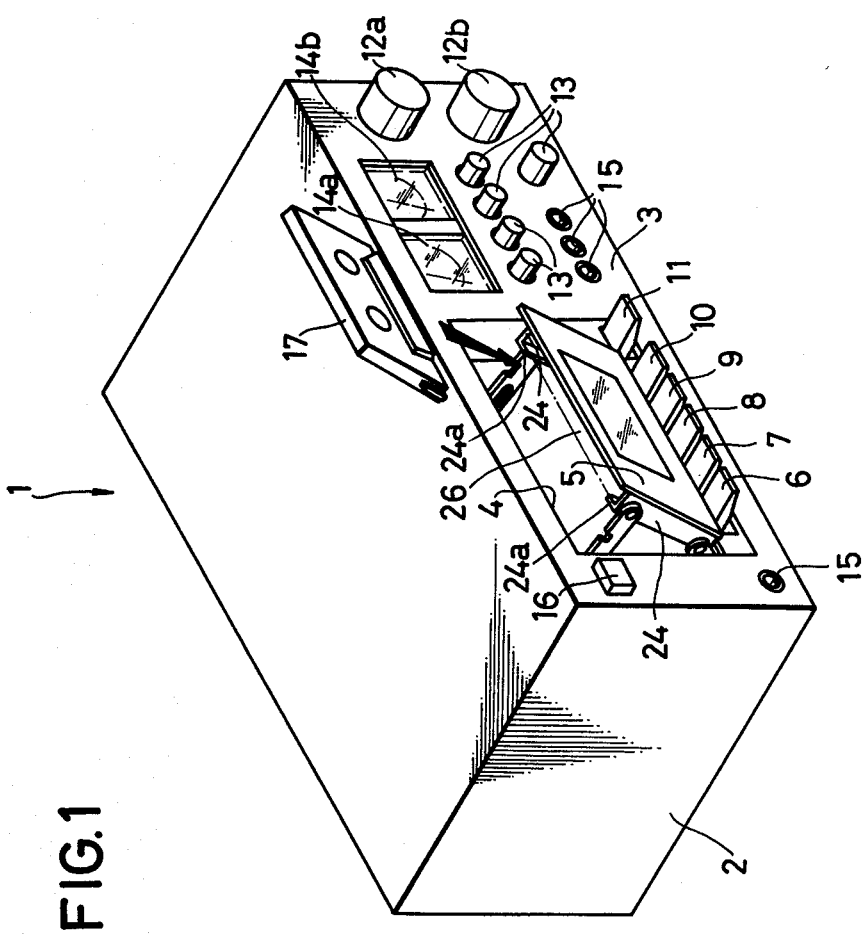
FIG. 1 is a perspective view of a front operation type tape deck including a cassette holder eject mechanism and eject speed control mechanism according to the present invention.

Referring now to the drawings in detail, and initially to FIG. 1 thereof, a front operation type tape deck 1, incorporating a cassette holder eject speed control mechanism according to the present invention has an opening 4 formed in the front panel 3 of its cabinet 2. A cassette holder or carriage 5 (sometimes referred to hereinafter as a cassette support frame) is movably mounted in opening 4 for movement between loading and operating positions, as described hereinafter. The tape deck 1 includes, in the conventional manner, a rewind button 6, stop button 7, reproducing button 8, fast forward button 9, recording button 10, and an eject button 11 on front panel 3, aligned beneath the cassette holder 5. Volume control knobs 12a, 12b, several other types of adjusting or control knobs 13, volume level meters 14a and 14b, plug insert jacks 15 and a lamp 16 are also provided in the conventional manner on other portions of front panel 3 at suitable positions.

Figure 2:
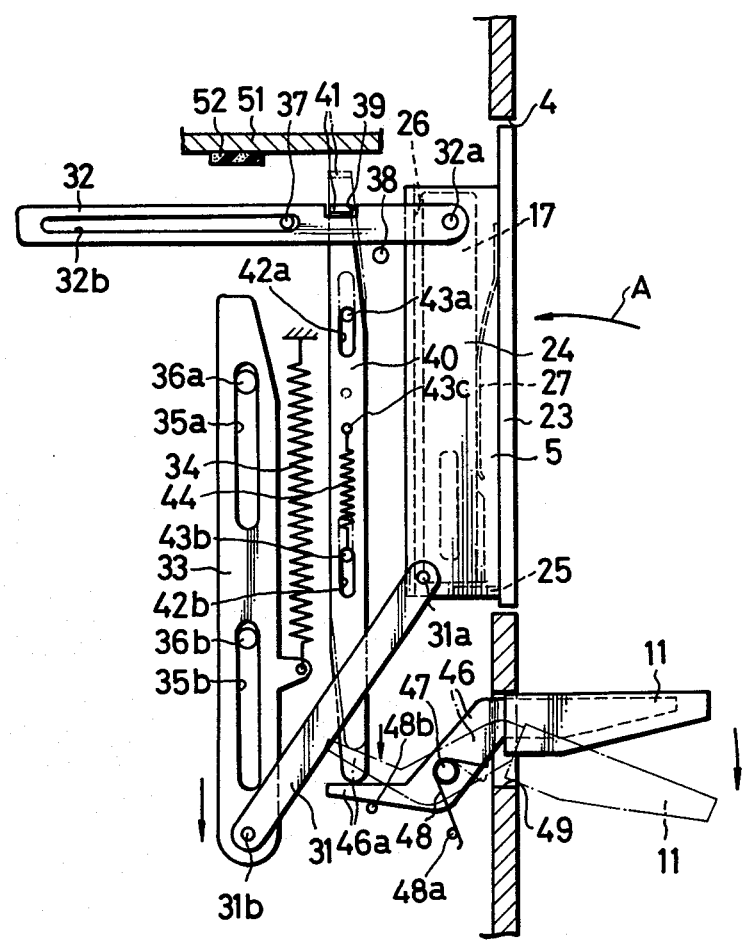
FIGS. 2 and 3 are partial side sectional views respectively showing the operating and eject positions of the cassette holder and the movements thereof between said positions according to one embodiment of the invention.
Figure 3:
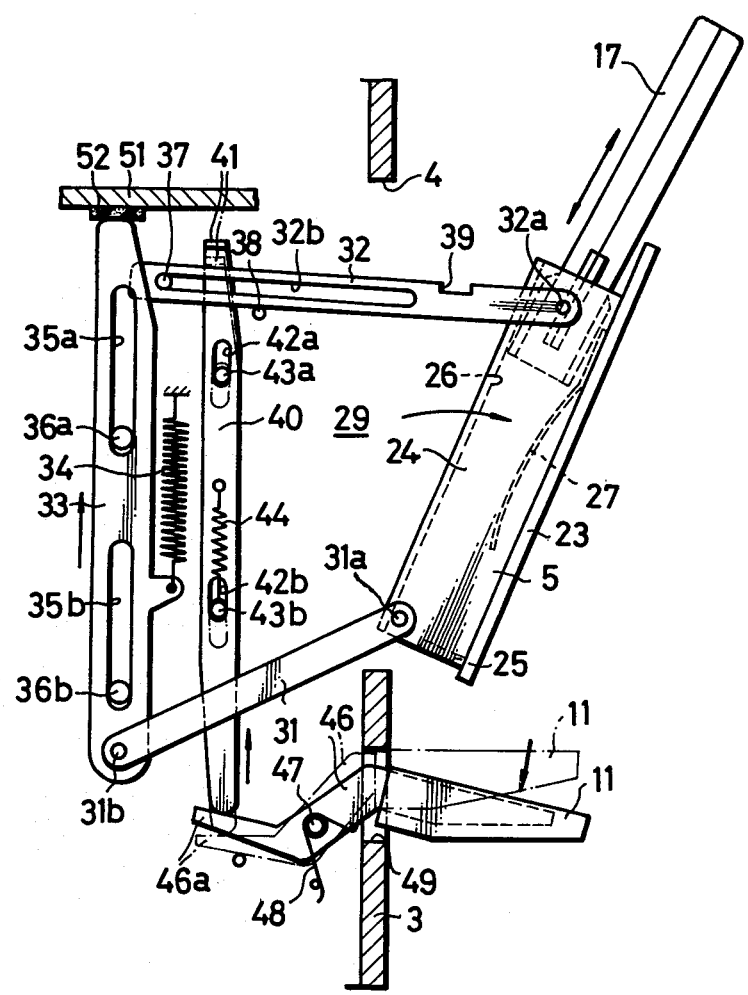

Referring now to FIGS. 2 and 3, when a tape cassette 17 is to be loaded in the tape deck, the cassette is inserted into the holder or carrier 5 in its open or loading position shown in FIG. 3, in the conventional manner, and the holder is then pushed by hand towards the housing 2 to its inner operating position where it is locked in position, as described below. As a result, the cassette 17 will be held at its predetermined operating position within housing 2. In this position, desired operations such as recording, reproducing, rewinding, fast forwarding and the like are effected by operating the buttons 6-10. When the cassette 17 is to be ejected, cassette holder 5 is automatically moved back to the loading position shown in FIG. 3 by pushing the eject button 11.

Cassette holder 5, illustrated in FIGS. 2 and 3, is generally called a "kangaroo pocket type" holder and includes cover plate 23 whose peripheral configuration corresponds substantially to the outer contour of opening 4, a pair of L-shaped cassette supporting frames 24 located at opposite sides of the inner surface of cover plate 23, and adapted to receive a cassette therebetween, and a cassette-receiver or bottom wall 25 which is fixed to the lower end of the inner surface of the cover plate 23 and extends perpendicularly therefrom. The cover plate 23, frames 24 and bottom wall 25 cooperate to define a generally rectangular upwardly opening pocket 26 which is adapted to receive the cassette 17 between supporting frames 24. Preferably, a pair of leaf springs 27 are secured to the inner surface of cover plate 23 to hold cassette 17 against the legs 24a of frames 24 to properly align the cassette with the recording and/or reproducing head of the tape deck in the operating position of the cassette.

As shown in FIG. 3, cassette holder 5 projects toward the outside or front of opening 4 in its loading or eject position and is mounted in housing 2 to rotate or move back and forth between its inclined loading position shown in FIG. 3 and its vertical operating position within the opening 4, as shown in FIG. 2. At the operating position opening 4 is closed by cover plate 23 and cassette 17 is supported in holder 5 at a predetermined operating position in tape deck 1, inside of the front panel 3. As a result cassette 17 is engaged with a pair of conventional reel shafts and capstans (not shown in the drawings) mounted in the tape deck at the operating position of the cassette, whereby the desired recording, reproducing, rewinding, fast forwarding or other operations can be effected.

Cassette holder 5 is mounted in tape deck 1 with the aid of a connecting arm 31 pivotally connected to the lower end of one of the support frames 24 by a pivot pin 31a, and a slide 32 pivotally connected to the upper end of the same support frame 24, by a pivot pin 32a. As described hereinafter the arm 31 and slide 32 are mounted in the tape deck to permit holder 5 to rotate in the tape deck between its loading or eject and operating positions. Although the drawings illustrate the arm 31 and slide 32 on only one side of the cassette holder, a corresponding arm and slide combination is preferably provided on the opposite side of the holder 5 as well.

The opposite end of connecting arm 31 from holder 5 is pivotally connected to the lower end of a movable slide 33 by a pivot pin 31b. Slide 32 is located within deck 1 and is adapted to slide or reciprocate therein in a vertical direction. This slide is normally biased into its upper position, shown in FIG. 3, by a spring 34 which is connected at its lower end of the slide and its upper end to a portion of the tape deck housing or frame.

The slide 33 includes a pair of elongated holes 35a and 35b which engage guide pins 35a, 35b, rigidly mounted in the frame of the tape deck 1, thereby to guide slide 33 during cassette loading and eject operations. By this arrangement, during an eject operation the pivot point 31a of holder 5 is displaced both upward and outward under the influence of spring 34, to move the holder 5 back to its eject position shown in FIG. 3 where cassette 17 can be easily inserted into and taken out of the holder.

Slide 32 serves to control the position and the inclination of cassette holder 5 at the eject position. Its movement is restricted by a guide pin 37 mounted on the main body or frame of tape deck 1, which pin is engaged in an elongated slot 32b formed in slide 32. To prevent slide 32 from pivoting downwardly, a guide pin 38 is provided on the main body of tape deck 1 for supporting slide 32 whereby upon movement of holder 5 slide 32 will slide along guide pin 38 in a horizontal path of travel.

In order to lock cassette holder 5 in its operating position, a lock tab 41 is provided on the upper end of a lock slide 40. This lock tab engages a recess 39 formed in the upper margin of slide 32 for selectively blocking its movement. As shown in FIG. 2 lock slide 40 extends vertically in tape deck 1 and has a pair of slots 42a, 42b formed therein which respectively receive a pair of guide pins 43a, 43b on the main body of tape deck 1 that serve to guide lock slide 40 in a straight vertical path of travel during its movements. The lock slide 40 is normally held in its lower locking position, illustrated in FIG. 2, by a spring 44 which is operatively engaged between guide pin 43b and a mounting pin 43c on slide 40.

In order to release slide 40 from its lower locking position shown in FIG. 2, an eject lever 46 is provided in the lower portion of front panel 3. This lever is pivoted by a pivot shaft 47, on the main body of tape deck 1, inside of front panel 3 in any convenient manner, and it is normally urged in a counterclockwise direction (as seen in FIG. 2) by a helical spring 48 engaged between the lever and a stop pin 48a in the housing. This movement is limited by a second stop pin 48b. A portion of eject lever 46 projects through an opening 49 in front panel 3 and is secured to the eject button 11. The inner end 46a of lever 46, in the limit position shown in solid lines in FIG. 2, engages the lower end of lock slide 40.

With this arrangement when it is desired to load the tape deck with a cassette and the holder 5 is in the eject position shown in FIG. 3, the cassette 17 is inserted into the inclined pocket 26 of holder 5 and the holder 5 is pushed by hand toward the left in FIG. 3, in the direction of the arrow A in FIG. 2. As a result, slide 32, guided by guide pins 37 and 38, is moved to the left and, simultaneously, connecting arm 31 is moved obliquely toward the left and downwardly, whereby holder 5 is moved horizontally, towards the left in FIG. 3, while also rotating in a counterclockwise direction into the operating position shown in FIG. 2. During this movement, lock tab 41 of lock slide 40 slides on the upper margin of slide lever 32 from the position shown in dotted lines in FIG. 3 towards the position shown in FIG. 2. At the same time, slide 33 is moved downward against the bias of spring 34 because of the movement of arm 31, so that spring 34 is lengthened and energized to produce a spring force for use in the eject operation.

Since lock slide 40 is urged downwardly at all times by spring 44, the moment holder 5 reaches the forward position shown in FIG. 2 lock tab 41 enters the recess 39 in slide 32 to lock the slide and thus all other elements of the above described mechanisms in the position shown in FIG. 2. In this manner holder 5 is locked in the operating position and the loading operation is completed. Accordingly a cassette 17 supported in holder 5 is loaded at the desired operating position so that the desired recording, reproducing, rewinding, fast forwarding operations or the like can be effected by operating the appropriate push buttons.

In order to eject cassette 17 from the position shown in FIG. 2, eject button 11 is depressed from its solid line to its phantom line position so that eject lever 46 is rotated in a clockwise direction against helical spring 48. As a result, lock slide 40 is pushed up against the bias of spring 44, as shown by the phantom lines in FIG. 2, and the lock tab 41 is disengaged from recess 39. This permits cassette holder 5 to move back to the eject position of FIG. 3 under the influence of spring 34. That is, slide 33 is now freed and moves upwardly under the force of the spring so that arm 31 is pushed out obliquely in toward the right and upwardly in FIG. 2. As this movement occurs, slide 32 is simultaneously pushed out toward the right in FIG. 2, while being guided by guide pins 37 and 38. As a result, cassette holder 5 is moved horizontally toward the right in FIG. 2 while also being rotated in the clockwise direction, until it reaches the eject position shown in FIG. 3. At this time, as shown in FIG. 3 the upper end of slide lever 33 engages a shock absorbing cushion or pad 52 mounted on a portion 51 of the chassis of the tape deck to stop upward movement of slide 33 and buffer the impact of the slide against the chassis.

Figure 4:
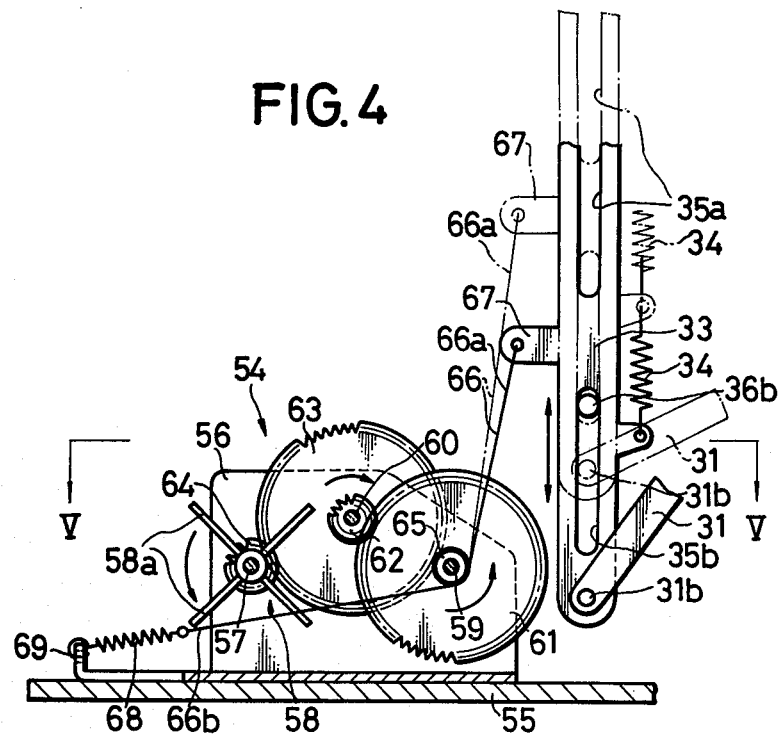
FIG. 4 is a partial side sectional view of an automatic speed adjusting mechanism according to one embodiment of the present invention used with the cassette holder shown in FIGS. 2 and 3.
Figure 5:
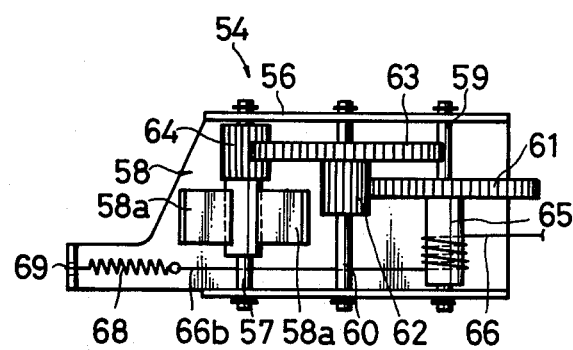
FIG. 5 is a plan view taken along line V—V of FIG. 4.

In accordance with a first embodiment of the present invention, illustrated in FIGS. 4 and 5, an automatic speed adjusting apparatus 54 is operatively connected to the cassette holder mechanism in order to control the speed at which the holder returns to its eject position, without affecting the movement of the holder from the position to the operating position. The speed adjusting apparatus 54 includes a gear box 56 secured to the chassis 55 of the tape deck, inside the front panel 3. A supporting shaft 57 for an impeller 58 is mounted in gear box 56, and an impeller 58 is rotatably mounted on shaft 57. The impeller has a plurality (for example, four) of blades or vanes 58a extending radially therefrom. In addition, a pair of gear supporting shafts 59 and 60 are mounted in gear box 56 and have gears 61, 62 and 63 rotatably supported thereon. Gears 62 and 63 are formed as a compound gear with the gear 61 engaged with the smaller gear portion 62 of the compound gear and the large gear 63 engaged with a gear 64 integrally formed with impeller 58. Gear 61 includes an extended shaft or spool on which a string 66 is wound during operation of the speed control mechanism, whereby rotary movement of the spool 65 is transmitted through gears 61, 64 to rotate impeller 58 at a relatively high speed.

String 66 forms a flexible transmission member in transmission 54 and it is strong and relatively fine, in order to produce a desired friction against spool 65. The string is wound around a circumferential surface of spool 65, in a plurality of turns, and preferably about 3 to 5 turns. One end 66a of string 66 is attached to a tab 67 on the slide 33 of the above described cassette holder mechanism, and the opposite end 66b of string 66 is attached to a tab 69 on gear box 56 through a spring 68.

At the beginning of a cassette loading operation, the slide 33 is located at its upper position shown in phanton lines in FIG. 4, as described above, and the end 66a of string 66 is pulled upward. When the cassette is loaded in the holder 5 and the holder is pushed back towards the operating position of FIG. 2, slide 33 is pushed down against the bias of spring 34 as described above. At the same time, the end 66a of string 66 is moved downwardly and string 66 becomes slack. As a result, string 66 does not produce any load against downward movement of slide 33. Thus only the force of spring 34 acts at slide 33, which results in a smooth downward movement of the slide in the same manner as occurs in the conventional mechanism. Consequently, holder 5 can be pushed into the operating position with a light manual force and the loading operation for the cassette can be smoothly effected because the automatic speed adjusting apparatus 54 does not function as a load against loading movement of cassette holder 5.

The slackness produced in string 66 by the cassette loading operation is absorbed by spring 68 and the end 66b of string 66 is pulled in the left direction in FIG. 4. Because of the slack in string 66, the string slips on the circumferential surface of spool 65 so that the spool does not rotate to any substantial extent. Preferably string 66 slips sufficiently on shaft 65 to produce no rotation, but a rotational torque developed by friction of the string 66 on spool 65 is in practice transmitted to spool 65 to some extent, so that spool 65 is rotated at a low speed in the same direction through gears 61–64. However, such limited rotation of the impeller 58 is generated merely by the slackness of the string 66 and does not substantially affect the loading operation for the cassette.

In the cassette operating position, the slide 33 is locked in its lower position, as described above, and as shown in solid lines in FIG. 5, with the end 66b of string 66 pulled by spring 68 to the left in FIG. 4 to its maximum extent, so that a suitable tension is produced in string 66. When it is desired to eject the cassette from its operating position, the push button 11 is depressed, as previously described, and slide 33 thus is pulled strongly in an upward direction by the spring force of spring 34. At the same time, the end 66a of string 66 is pulled strongly upwardly with slide 33 so that a substantial tension is produced in and acts on string 66. Since the end 66b of the string is simultaneously pulled in an opposite direction by spring 68, the string 66 is held tightly to the circumferential surface of spool 65 in the turns of the string around the spool. Thus, as the end 66a of string 66 is pulled upwardly string 66 applies a rotational torque in a counterclockwise direction to spool 65, without slipping against the spool. This rotational torque is transmitted to impeller 58 through gears 61-64 so that the impeller 58 is rotated in the counterclockwise direction in FIG. 4 at a high speed.

When the impeller 58 is rotated at a high speed an air resistance acts on its radially extending blades 58a. This air resistance is transmitted to slide 33 through the gears 64-61, the shaft 65 and string 66; that is, a feedback of the air resistance to slide 33 is effected. As a result, the air resistance functions as a load against upward movement of slide 33, and thus as a load against opening of holder 5. Consequently slide 33 moves upwardly at a much lower speed than it would if it were subject to the spring force of spring 34. The speed of upward movement of slide 33 is thus controlled at a very stable speed, because the air resistance obtained by the high speed rotation of impeller 58 is itself very stable. Accordingly cassette holder 5 is also slowly back to its eject position at a very stable or safe speed, synchronized with the upward movement of slide 33. As a result, the automatic speed adjusting apparatus 54 avoids the problems of previously proposed cassette eject apparatus wherein the cassette holder 5 can collide impulsively with a hand of an operator to injure him on the eject operation for the cassette. In addition, no substantial impulse force is generated at the terminal moment of the eject movement of cassette holder 5 since the holder moves slowly and is very quietly stopped at the eject position by the engagement of slide 33 with pad 52. Thus the apparatus avoids the disadvantages of conventional tape decks wherein a strong impulse force is applied to the whole of the tape deck mechanism at the terminal moment of the eject movement.

Another embodiment of the present invention uses an air damper or dash pot mechanism 70 as an automatic speed adjusting apparatus for the cassette eject operation. In the illustrative embodiment of the invention a cassette holder mechanism, similar to that described above, is used including the slide 33. An air cylinder 77 cooperates with this slide and is mounted in a vertical position on the main body or chassis of the tape deck. The air cylinder or dash pot includes a piston 72 movably mounted therein for reciprocation in upward and downward directions. The piston includes a piston rod 73 extending upwardly from the piston and having its upper end pivoted, via a pivot pin 75, on a support tab 74 formed on slide 33. A relatively large port 76 is formed in piston 72, and a one way or non-return valve 77 (e.g. a flap valve) is mounted on the piston adjacent port 76 to control air flow through the port. The non-return valve 77 closes to shut port 76 when piston 72 is moved upwardly during an eject operation, and opens to open the port 76 when piston 72 is moved downward during a loading operation. In addition, a very small port 78, for admitting air into the chamber 78a of the dash pot, is formed in air cylinder 71, with one end of the port being connected to an air suction pipe 79. Air suction pipe 79 is made of, for example, a synthetic resin and is very narrow and relatively long, and has its free end 80 open to the atmosphere to permit air to flow through the tube into chamber 78a.

Figure 6:
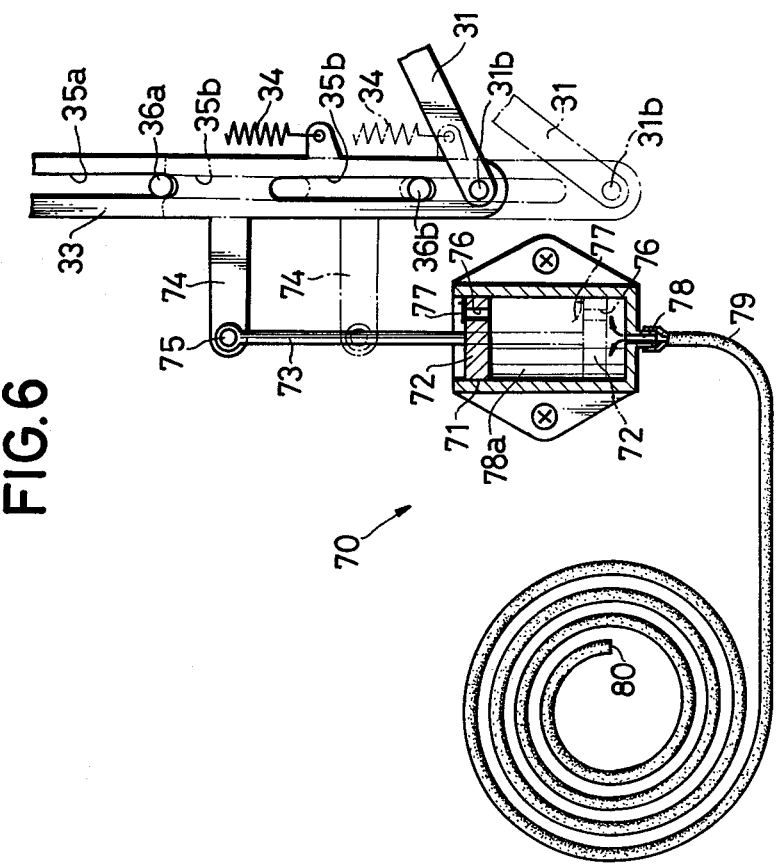
FIG. 6 is a partial side sectional view, similar to FIG. 4, of an automatic speed adjusting mechanism according to a second embodiment of the present invention.

With this arrangement, piston 72 and piston rod 73 move upwardly (from a lower position shown by phantom lines in FIG. 6 to an upper position shown by solid lines), when slide 33 is moved upwardly by spring 34 during an eject operation. During this movement the non-return or one way flap valve 72 closes, so that port 76 is shut down and air is drawn into air cylinder 71 by piston 72 through opening 80, air suction pipe 79 and port 78. As a result, a viscous resistance is produced by the air drawn into pipe 79, which resistance is relatively large because the pipe 79 is long and narrow. This resistance controls or limits the speed of upward movement of piston 72, so that slide 33 moves very slowly upwardly. Accordingly the speed of movement of the holder is controlled to a safe slow speed during the eject operation.

When slide 33 is moved downwardly during the loading operation for a tape cassette, the valve 77 opens to open port 76. As a result, the air in the chamber 78a of air cylinder 71 smoothly and rapidly escapes through port 76, so that the piston does not produce any substantial load or resistance to the downward movement of slide 33. And the slide moves downwardly smoothly against the resistance of spring 34 as in the previously described embodiments.

Figure 7:
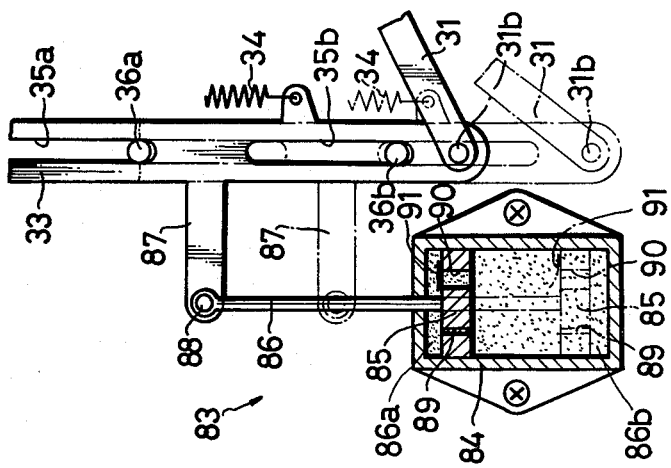
FIG. 7 is a partial side sectional view, similar to FIG. 6, of an automatic speed adjusting mechanism according to a third embodiment of the present invention.

Another embodiment of the present invention is illustrated in FIG. 7 wherein an oil damper mechanism or dash pot 83 is used as an automatic speed adjusting apparatus to control the eject speed of the cassette holder 5. In this embodiment the cassette holder and eject mechanism is the same as that previously described herein. The damper mechanism 83 includes an oil cylinder 84 which is mounted vertically in the chassis of the tape deck in any convenient manner. The oil cylinder is fluid tight and oil of a suitable viscosity, e.g. silicon oil, is contained in the cylinder. A piston 85 is positioned in the cylinder and is reciprocated therein during movement of the eject mechanism. The piston includes a piston rod 86 whose upper end projects through the cylinder and is pivotally connected, by a pivot pin 88, to an integral tab 87 on slide 33. A narrow oil port 89 and a larger oil port 90 are formed in piston 85, and a non-return, one way, valve, e.g. flap valve 91 is mounted on the piston in association with port 90. The non-return valve 91 closes to shut port 90 when piston 85 moves upwardly and opens to open port 90 when piston 8t moves downwardly.

When the cassette holder 5 is moved to its eject position, shown in FIG. 3, piston 85 and piston rod 86 move upwardly as slide 33, by the action of spring 34, is moved from its lower position, shown in phantom lines in FIG. 7, to its upper position, shown in solid lines. As a result, the non-return valve 91 closes port 90 so that oil in the upper oil cylinder chamber 86a slowly passes through port 89 to the lower chamber 86b. It this manner, the viscous resistance of the oil in the cylinder resists upward movement of piston 85, and thus of slide 33, to control the speed of upward movement of the piston and slide, thereby to slow the speed of movement of cassette holder 5 towards its eject position.

When slide 33 moves downwardly, i.e. when cassette holder 5 is moved to the operating position, the non-return valve 91 opens port 90 so that oil in cylinder 84 flows substantially freely from lower chamber 86b of cylinder 84 to the upper chamber through both ports 90 and 91. Consequently substantially no load acts on piston 85 at that time and slide 33 moves downwardly so that movement of cassette holder 5 to its operating position is not substantially affected.

Figure 8:
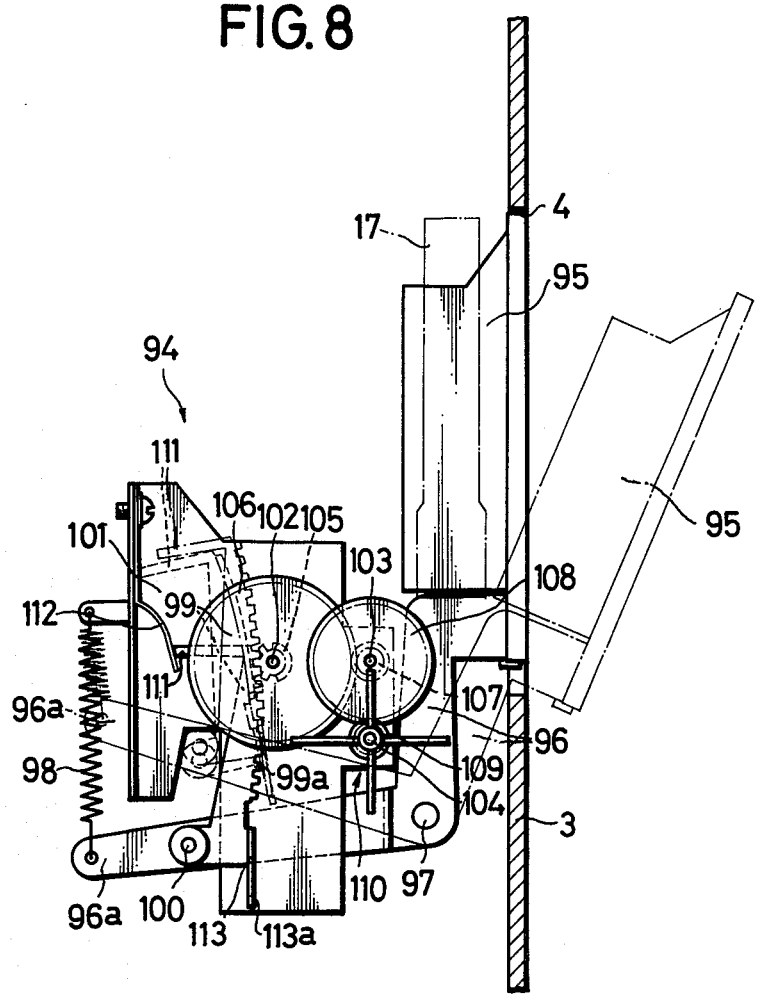
FIG. 8 is a partial side sectional view, similar to FIG. 6, of an automatic speed adjusting apparatus according to a fourth embodiment of the present invention.

Another embodiment of the present invention, also using an impeller to provide an automatic speed adjusting apparatus 94, is illustrated in FIG. 8. In this embodiment a cassette holder 95, similar to the cassette holder 5 described above, is provided which includes a pair of support levers 96 secured to the bottom of the cassette holder 95. The levers are secured to opposite sides of the holder and thus only one lever is seen in the side view of FIG. 8.

The support levers 96 are rotatably mounted by a pivot shaft 97 or the like on the chassis of the tape deck, so that cassette holder 95 is rotatable on pivot shaft 97 between an eject position, shown in phantom lines in FIG. 8, and an operating position, shown in solid lines. Cassette holder 95 is normally urged in a clockwise direction in FIG. 8 by a spring 98, and is latched in its operating position by a conventional latching mechanism (not shown) which is released upon actuation of an eject button in the conventional manner. A substantially L-shaped rack 99, having an arcuate array of gear teeth 99a formed thereon, is rotatably mounted by means of a pivot pin 100 on the inner end 96a of one of the support levers 96. A portion of the chassis 101 of the tape deck is located to one side of the path of travel of this rack, in its upward and a downward movement. The chassis supports a plurality of gear support shafts (e.g. two) 102 and 103 and one impeller supporting shaft 104. A compound gear 106, including a smaller pinion gear 105 is rotatably mounted on support shaft 102, and a second compound gear 108, including a smaller pinion gear 107 is rotatably mounted on shaft 103, with gear 107 engaged with gear 106. An impeller 110 is rotatably mounted on shaft 104 and includes an integral pinion gear 109 engaged with gear 108; with gear 105 being normally engaged with rack 99. The various gears are driven, as described hereinafter, to rotate the impeller at a relatively high speed during the movement of the cassette holder 95 from its operating to its eject position.

A projection 111 is integrally formed on the upper end of rack 99, and a leaf spring 112 is mounted on chassis portion 101 to control the position of projection 111, and thus rack 99. In addition, an elastic piece or extension is formed on the lower end of the rack 99 and extends downwardly therefrom such that its lower end 113a is usually elastically pressed against a part of the chassis 101 so as to slide on the chassis with such a condition being kept. For example, the elastic piece may be an inverted U-shaped elastic member having its legs engaged between and against the chassis wall 101 shown and a parallely spaced wall not shown in the drawing, so that the legs frictionally engage these walls and can slide with respect thereto.

When an eject operation is to be performed, the cassette holder 95 is rotated in the clockwise direction by the spring force in spring 98 upon actuation of the eject button, so that the holder moves from its operating position (shown in solid lines) to its eject position (shown in phantom lines), and rack 99 is driven upwardly by pivot pin 100 as the support lever 96 rotates in the clockwise direction. At the same time, this rotational movement acts on rack 99 to move it in a clockwise direction while the lower end 113a of the elastic piece 113 functions as a support point for the rack because of the engagement between the lower end 113a of the rack and the chassis 101, so that a frictional resistance therebetween acts on the lower end 113a. As a result, rack 99 is held against pinion 105 through the arcuate row of teeth 99a, and the pinion 105 is driven in the clockwise direction by the upward movement of the rack 99. In this manner, impeller 110 is driven at a high rotary speed in a clockwise direction through the gears 106–109 so that cassette holder 95 returns slowly to its reject position because of the air resistance produced by impeller 110.

When cassette holder 95 is rotated in a counterclockwise direction, in a cassette loading operation, rack 99 is pulled down by the downward movement of pivot pin 100. At this time, a rotational moment acts on rack 99 in the counterclockwise direction, while the lower end 113a of elastic piece 113 functions as a supporting point for the rotation, i.e. the end 113a frictionally resists movement of the lever so that as pivot point 100 moves down and the end 113a remains relatively stationary the rack will pivot slightly about end 113a so that rack 99 escapes toward the position shown in dotted lines in FIG. 8 from the position shown by phantom lines in FIG. 8 the moment the rack begins to move downwardly, so that the rack is disengaged from pinion 105. Consequently, impeller 110 is not rotated during the cassette loading operation and cassette holder 95 can be moved smoothly from its eject position to its operating position against only the bias of spring 98.

Moreover, when cassette holder 95 reaches its operating position, rack 99 reaches the lowest position shown by solid lines in FIG. 8. However, immediately before reaching this lowest position, projection 111 engages leaf spring 112 and is pushed to the right in FIG. 8 so that rack 99 is returned to its original position at which it is again engaged with pinion 105.

In this embodiment the elastic piece 113 of the rack 99 is not necessarily provided. That is, even if elastic piece 113 is omitted, the positional relationship between pivot pin 100, rack teeth 99a, pinion 105 and the other elements of the mechanism are designed so that rack 99 is engaged with pinion 105 during the eject operation, and escapes from pinion 105 during the cassette loading operation.

Accordingly, it is seen that this invention provides a recording and/or reproducing apparatus wherein the speed of movement of the cassette holder during an eject operation is automatically adjusted to a safe slow speed by the use of an automatic speed adjusting apparatus which resists the impulse applied to the cassette holder from the drive spring. Accordingly the cassette holder is moved back to its eject position at a speed which will avoid the possibility of the cassette holder unexpectedly colliding with a hand of the operator. Moreover, the usually strong impulse given to whole of the tape deck at the end of the eject movement of the cassette holder is eliminated so that wear and damage to the tape deck is eliminated and the safety and reliability of the deck is remarkably improved. Furthermore, the automatic speed adjusting apparatus according to the present invention does not substantially affect movement of the cassette holder from its eject position to its operating position, so that the loading operation for the cassette can be very rapidly and smoothly effected, with a slight manual force in the same manner as in conventional apparatus.

While there have been described herein several preferred embodiments of the present invention, it is to be understood that various modifications and changes may be effected therein by one skilled in the art without departing from the scope or spirit of this invention.

What is claimed is:

1. A magnetic tape recording and/or reproducing apparatus including a housing, a cassette support frame movably mounted on said housing for movement between a first loading position and a second recording and/or reproducing position with respect to said housing; spring bias means for norally urging said support frame from said second position to said first position; releasable latch means for holding said frame in said second position against the bias of said spring bias means; a linkage coupled to said support frame; and unidirectional fluidic resistance means coupled to said linkage for exerting a fluid resistance against the movement of said frame substantially only from said second position to said first position, thereby reducing the speed of movement of said frame from said second to said first position against the bias of said spring bias means without effecting movement of said frame from the first to the second position thereof.

2. A magnetic tape recording and/or reproducing apparatus including a housing, a cassette support frame movably mounted on said housing for movement between a first loading position and a second recording and/or reproducing position with respect to said housing; means for normally urging said support frame from said second position to said first position; releasable latch means for holding said frame in said second position against the bias of said urging means, and an automatic speed control means operatively engaged with said frame for reducing the speed of movement of said frame from said second to said first position against the bias of said urging means without effecting movement of said frame from the first to the second position thereof, said control means comprising an air impeller rotatably mounted on said housing and transmission means operatively connected between said impeller and said frame for rotating said impeller when the frame moves from said second to said first position, but not when the frame is moved from said first to said second position.

3. Apparatus as defined in claim 2 wherein said transmission means includes a drive shaft, gear means for operatively engaging the drive shaft with said impeller, and a flexible transmission member having one end mounted in said housing in a fixed position and an opposite end operatively engaged with said frame in position to move further away from said drive shaft as the frame moves from its second to its first position, said flexible transmission member including an intermediate portion wrapped about said drive shaft thereby to rotate the drive shaft when said frame moves from said first to said second position.

4. Apparatus as defined in claim 3 wherein said flexible transmission member includes a resilient portion located between said drive shaft and said one end of the flexible transmission member.

5. A magnetic tape recording and/or reproducing apparatus including a housing, a cassette support frame movably mounted on said housing for movement between a first loading position and a second recording and/or reproducing position with respect to said housing; means for normally urging said support frame from said second position to said first position; releasable latch means for holding said frame in said second position against the bias of said urging means, and an automatic speed control means operatively engaged with said frame for reducing the speed of movement of said frame from said second to said first position against the bias of said urging means without effecting movement of said frame from the first to the second position thereof, said control means comprising a dash pot having a piston thereon and a piston rod extending therefrom, one of said dash pot and piston rod being operatively connected to said frame.

6. Apparatus as defined in claim 5 wherein said dash pot has a small opening therein to admit air and said piston has a one way valve mounted therein whereby movement of the piston in one direction closes the valve and draws air through said small opening and resists movement of said frame while movement of the piston in an opposite direction opens the valve to permit escape of air from the dash pot without substantially resisting movement of the frame.

7. Apparatus as defined in claim 5 wherein said dash pot defines a closed chamber having said piston therein and said piston rod extending therefrom, said piston having first and second ports formed therein and extending therethrough, with said first port being substantially smaller than said second port; and a one way valve associated with said second port.

8. In a magnetic tape recording and/or reproducing apparatus including a housing, a cassette holder movably mounted in the housing for movement between a first loading position and a second operating position in the housing for recording and/or reproducing information on a cassette in the holder, spring means for normally urging said cassette holder from said second position to said first position and releasable latch means for holding said cassette holder in said operating position against the bias of said spring means, the improvement comprising unidirectional fluidic resistance means operable to exert a retarding fluid resistance force; and a linkage for coupling said cassette holder to said fluidic resistance means to operate the latter substantially only when said cassette holder moves from said second position to said first position and retard such movement of said cassette holder thereby to reduce the speed of movement of said cassette holder from said operating position to said loading position, and for permitting said cassette holder to be moved from said loading position to said operating position against the bias of said spring means without any substantial resistance from said unidirectional fluidic resistance means.

9. In a magnetic tape recording and/or reproducing apparatus including a housing, a cassette holder movably mounted in the housing for movement between a first loading position and a second operating position in the housing for recording and/or reproducing information on a cassette in the holder, spring means for normally urging said cassette holder from said second position to said first position and releasable latch means for holding said cassette holder in said operating position against the bias of said urging means, the improvement comprising an air impeller rotatably mounted on said housing and transmission means operatively connected between said impeller and said cassette holder for rotating said impeller when the cassette holder moves from said second to said first position, but not when the cassette holder is moved from said first to said second position, thereby to reduce the speed of movement of said cassette holder from said operating position to said loading position, and for permitting said cassette holder to be moved from said loading position to said operating position against the bias of said spring means without any substantial resistance from said air impeller.

10. Apparatus as defined in claim 9 wherein said transmission means includes a drive shaft, gear means for operatively engaging the drive shaft with said impeller, and a flexible transmission member having one end mounted in said housing in a fixed position and an opposite end operatively engaged with said cassette holder in position to move further away from said drive shaft as the frame moves from its second to its first position, said flexible transmission member including an intermediate portion wrapped about said drive shaft thereby to rotate the drive shaft when said cassette holder moves from said first to said second position.

11. In a magnetic tape recording and/or reproducing apparatus including a housing, a cassette holder movably mounted in the housing for movement between a first loading position and a second operating position in the housing for recording and/or reproducing information on a cassette in the holder, spring means for normally urging said cassette holder from said second position to said first position and releasable latch means for holding said cassette holder in said operating position against the bias of said urging means, the improvement comprising a dash pot having a piston thereon and a piston rod extending therefrom, one of said dash pot and piston rod being operatively connected to said cassette holder, thereby to reduce the speed of movement of said cassette holder from said operating position to said loading position, and for permitting said cassette holder to be moved from said loading position to said operating position against the bias of said spring means without any substantial resistance from said dash pot.

12. Apparatus as defined in claim 11 wherein said dash pot has a small opening therein to admit air and said piston has a one way valve mounted therein whereby movement of the piston in one direction closes the valve and draws air through said small opening and resists movement of said cassette holder while movement of the piston in an opposite direction opens the valve to permit escape of air from the dash pot without substantially resisting movement of the cassette holder.

13. Apparatus as defined in claim 11 wherein said dash pot defines a closed chamber having said piston therein and said piston rod extending therefrom, said piston having first and second ports formed therein and extending therethrough, with said first port being substantially smaller than said second port; and a one way valve associated with said second port.

* * * * *